US007626640B2

(12) United States Patent
Toida

(10) Patent No.: US 7,626,640 B2
(45) Date of Patent: Dec. 1, 2009

(54) DIGITAL BROADCAST RECEIVER AND METHOD OF CONTROLLING RECEPTION OF DIGITAL BROADCASTS

(75) Inventor: Takashi Toida, Tokyo (JP)

(73) Assignee: Sony Corporation, Tokyo (JP)

( * ) Notice: Subject to any disclaimer, the term of this patent is extended or adjusted under 35 U.S.C. 154(b) by 773 days.

(21) Appl. No.: 11/294,033

(22) Filed: Dec. 5, 2005

(65) Prior Publication Data

US 2006/0133774 A1 Jun. 22, 2006

(30) Foreign Application Priority Data

Dec. 6, 2004 (JP) .............................. 2004-353122

(51) Int. Cl.
H04N 5/44 (2006.01)
H04N 5/76 (2006.01)
(52) U.S. Cl. ...................... 348/725; 348/553; 348/729; 348/720; 375/316; 375/349; 386/40
(58) Field of Classification Search ................. 348/725, 348/731, 720, 723, 729, 21, 705, 706, 553; 386/46, 40, 75; 375/316, 328, 349
See application file for complete search history.

(56) References Cited

U.S. PATENT DOCUMENTS

| 6,795,125 | B2* | 9/2004 | Yui .............................. 348/564 |
| 7,248,304 | B2* | 7/2007 | Okada et al. ................. 348/731 |
| 2005/0125819 | A1* | 6/2005 | Ono et al. ...................... 725/14 |
| 2006/0225122 | A1* | 10/2006 | Aratani et al. ............... 725/139 |

* cited by examiner

Primary Examiner—David L Ometz
Assistant Examiner—Jean W Désir
(74) Attorney, Agent, or Firm—Frommer Lawrence & Haug LLP; William S. Frommer; Thomas F. Presson

(57) ABSTRACT

A digital broadcast receiver includes: first reception means for receiving a certain channel of program from a multichannel digital broadcast under a state of normal viewing; first decoding means for decoding an encoded signal of the digital broadcast received by the first reception means and for outputting the decoded signal as a signal for viewing; second reception means for receiving the digital broadcast in the certain channel from the multichannel digital broadcast under the state of normal viewing; and second decoding means for decoding the encoded signal of the digital broadcast received by the second reception means and for outputting the decoded signal as a signal for recording.

8 Claims, 5 Drawing Sheets

DIGITAL BROADCAST RECEIVER OF ONE EMBODIMENT

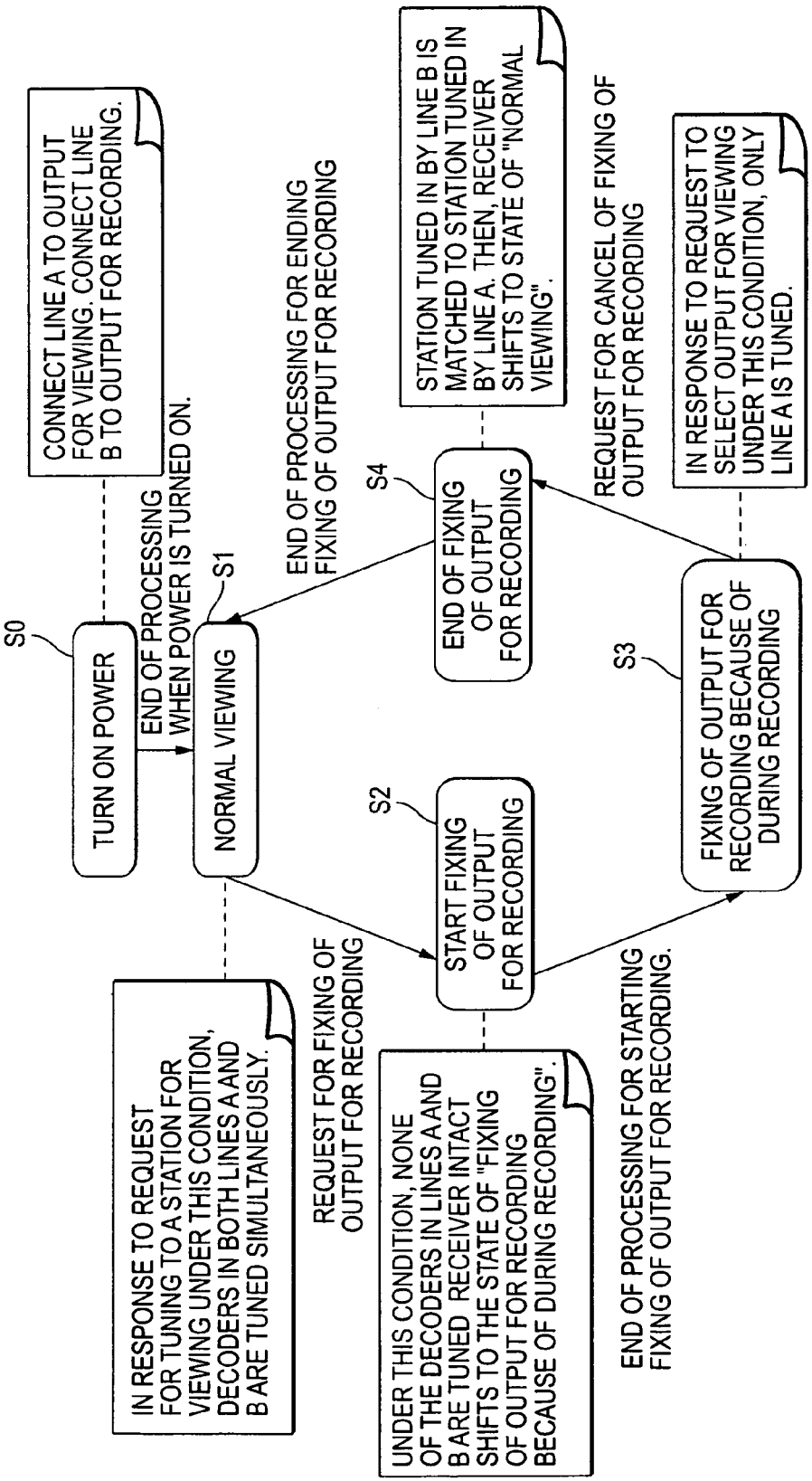

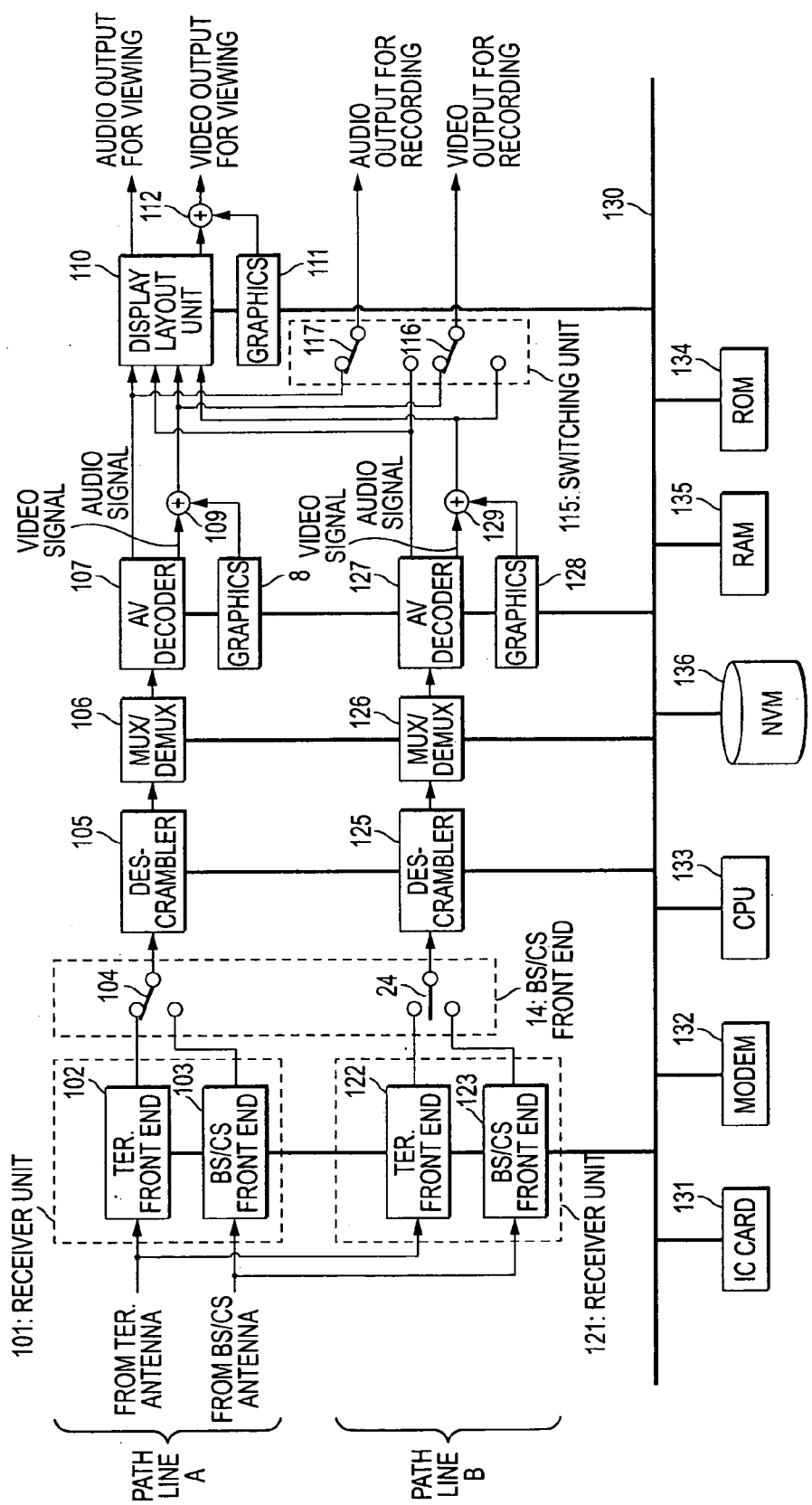

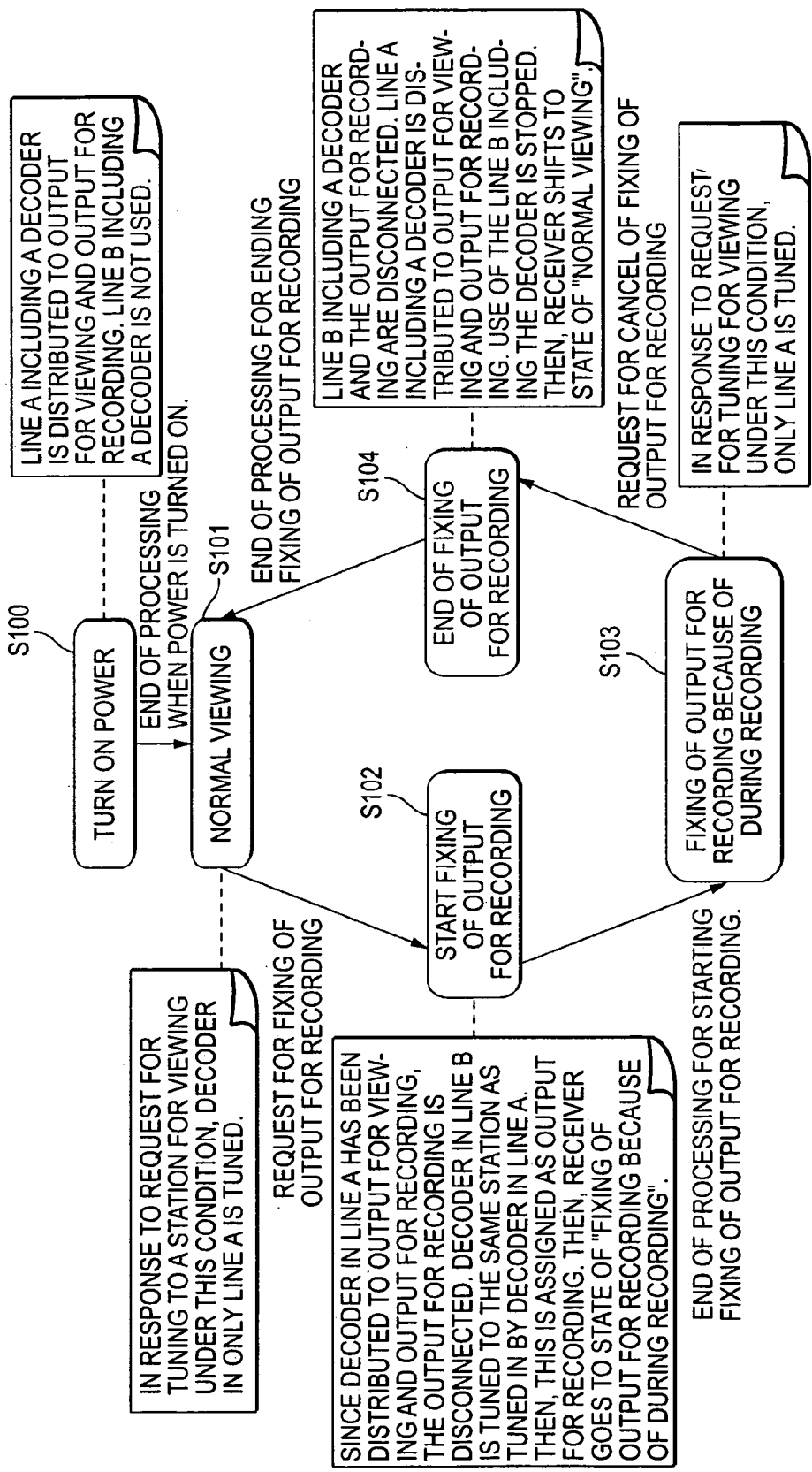

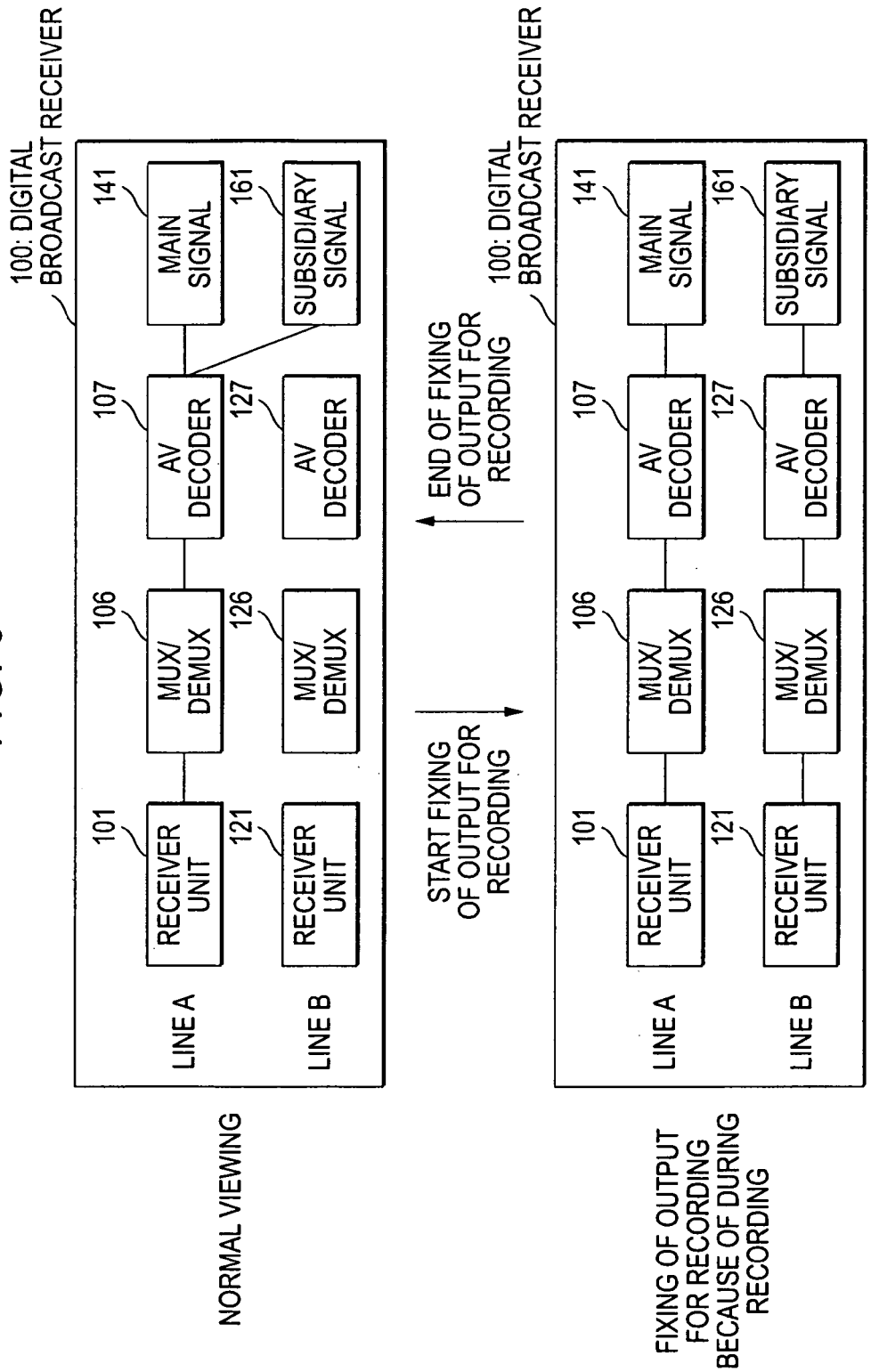

DIGITAL BROADCAST RECEIVER AND METHOD OF CONTROLLING RECEPTION OF DIGITAL BROADCASTS

CROSS REFERENCES TO RELATED APPLICATIONS

The present invention contains subject matter related to Japanese Patent Application JP2004-353122 filed in the Japanese Patent Office on Dec. 6, 2004, the entire contents of which being incorporated herein by reference.

BACKGROUND OF THE INVENTION

1. Field of the Invention

The present invention relates to a digital broadcast receiver and to a method of controlling reception of digital broadcasts and, more particularly, to a digital broadcast receiver equipped with a plurality of decoders and also to a method of controlling reception of digital broadcasts using this receiver.

2. Description of the Related Art

In the past, in a digital broadcast receiver having only one decoder, the following operations have been performed when one service (digital broadcast program) is viewed and listened to. A received, encoded signal of a digital broadcast program is decoded by one video/audio decoder, and the decoded signal is distributed to the output for viewing and output for recording. A so-called, dual-decoded digital broadcast receiver equipped with two decoders is available as an extension of the aforementioned digital broadcast receiver. Also, in this case, when one service is viewed and listened to, a received encoded signal of a digital broadcast program is decoded by one decoder and distributed to the output for viewing and output for recording.

A related art digital broadcast receiver is described below in detail with reference to drawings.

FIG. 3 shows a block diagram of a related art digital broadcast receiver. In FIG. 3, a receiver unit 101 is equipped with front ends 102 and 103. The front end 102 corresponds to multichannel terrestrial airwaves received at an antenna (TER. antenna) for terrestrial digital broadcasts, while the other front end 103 corresponds to an antenna for BS (Broadcasting/Satellite)/CS (Communications Satellite) (hereinafter abbreviated BS/CS) digital broadcasts. Each front end tunes in to one channel either out of multiple channels of terrestrial airwaves received or out of multiple channels of BS/CS TV received and demodulates the channel into a signal that can be image-processed. Another receiver unit 121 is also equipped with front ends 122 and 123 and has functions similar to those of the receiver unit 101.

A selector unit 114 is equipped with switches 104 and 124 and makes a choice between terrestrial airwaves and BS/CS broadcasts based on a user's instruction. In this example, the switch 104 selects the terrestrial TV front end 102, whereas the switch 124 is not in use.

Descramblers 105 and 125 are devices for performing descrambling making use of key information in an IC card portion. Multiplex/demultiplex units (MUX/DEMUX) 106 and 126 extract audio and video signals, superimposed character information, electronic (or electric) program guide (EPG) information, control signals, and other information from the descrambled digital broadcast downstream data.

Audio/video decoders (AV decoders) 107 and 127 are devices for decoding the encoded audio and video signals extracted by the multiplex/demultiplex units 106 and 126. Graphics units 108 and 128 process the superimposed character information sent from a CPU (described later). In some forms of the graphics units 108 and 128, they directly receive the superimposed character information from the multiplex/demultiplex units 106 and 126 and process the information in a given manner. Adders 109 and 129 superimpose the character information delivered from the graphics units 108 and 128 onto the video signals delivered from the audio/video decoders 107 and 127, respectively.

A display layout unit 110 is a device for outputting the audio signals from the audio/video decoders 107 and 127 and the video signals from the adders 109 and 129 on which the character information has been superimposed, according to the form of display on a display device (not shown) connected for viewing.

In a case where the display device (not shown) has a function of displaying plural pictures on a single display screen, for example, the display layout unit 110 displays only one of plural pictures when the display device is in the single-picture mode. When the display device is in the dual-picture mode, the display layout unit displays the two images on the display screen, thus achieving dual picture display. When two or more pictures are displayed, the graphics unit 111 controls the arrangement of the superimposed characters.

The audio signal from the audio/video decoder 107 and the video signal from the adder 109 on which the character information has been superimposed are output to a recording device (not shown) via a switching unit 115 for recording purposes. The switching unit 115 has switches 116 and 117 and connects the switches 116 and 117 either with the audio/video decoder 107 or with the audio/video decoder 127 according to a user's instruction such that the output for recording is supplied to the recording device. The signal entered for recording into the recording device is recorded as recorded data in a nonvolatile recording device (not shown).

Key information for performing descrambling in a limited reception method such as a conditional access (CA) system is recorded in an IC card portion 131. A modem 132 is a device, for example, which when personal information about users and information about fees are sent to a broadcast provider in a pay broadcast service, makes an access to the Internet from the modem via a telephone network and performs bidirectional communication of information. A CPU (central processing unit) 133 is a device for controlling the whole digital broadcast receiver. For example, the CPU provides control to switch the decoders according to a program loaded in a ROM (read-only memory) 134. A RAM (random access memory) 135 is a memory acting as a working area for the CPU 133. A nonvolatile memory (NVM) 136 is a memory for storing, for example, a channel number viewed by the viewer immediately before the power supply was turned off last time.

These IC card portion 131, modem 132, CPU 133, ROM 134, RAM 135, and nonvolatile memory 136 are connected by a bus (control line) 130 to permit data communications among them. Connected with the bus 130 are the front ends 102, 103, 122, 123 of the receiver units 101, 121, descramblers 105, 125, multiplex/demultiplex units 106, 126, audio/video decoders 107, 127, graphics units 108, 128, display layout unit 110, and graphics unit 111. The CPU 133 controls the above-described various portions via the bus 130.

In the above-described digital broadcast receiver of FIG. 3, the signal path line passing through the receiver unit 101, descrambler 105, multiplex/demultiplex unit 106, and audio/video decoder 107 is hereinafter referred to as the path line A. The signal path line passing through the receiver unit 121, descrambler 125, multiplex/demultiplex unit 126, and audio/video decoder 127 is referred to as the path line B. In FIG. 3, a service received through the receiver unit 101, descrambler 105, multiplex/demultiplex unit 106, and audio/video decoder 107, i.e., path line A, is distributed to the output for viewing and output for recording.

In the state shown in FIG. 3, when the user wants to record the received service, video and audio signals for recording are output from the audio/video decoder 127 to the recording output terminal. The signals are recorded in the recording device (such as a video tape recorder) connected with the terminal. At this time, the recording output side is not allowed to switch the video and audio signals to other service or other downstream data until the recording is complete. In this way, variation in the state is restricted because of the specifications of the product. Under this state, if the user wants to view and listen to a service which is being offered by the same digital broadcast but is not being recorded and if the user switches the service or stream data, processing for disconnecting the decoder in the path line A is preferably performed.

In particular, in FIG. 3, there may arise the need to decode a service (to be viewed) not recorded by the audio/video decoder 127 by switching the switch 124 and connecting the terrestrial TV front end 122 and descrambler 125. The display layout unit 110 may need to switch the displayed content from the video and audio signals from the audio/video decoder 107 to outputting of the video and audio signals from the audio/video decoder 127. In this case, the timing at which the viewed service is switched is identical with the timing at which the device is switched from one to another. Therefore, no special problems occur in terms of the specification of the product.

Also, a digital broadcast receiver has been proposed which is capable of recording programs different from the program being displayed and which permits one to select these programs easily using a program guide; then the programs can be displayed or recorded (for example, see patent reference 1).

Patent Reference 1: JP-A-11-18020

SUMMARY OF THE INVENTION

In the case of digital broadcasts, one service may contain a program including plural sets of audio and video signals. When such a digital broadcast program is being recorded, if an operation for switching the language of audio signal from Japanese to English without varying the viewed channel such as a dual-language broadcast is performed, a circumstance occurs in which the audio decoder within the audio/video decoder has to be switched. At this time, some problems occur according to the method of controlling the switching.

If both audio/video decoders 107 and 127 are switched at this timing, for example, a display which should be seen to be continuous suffers from a break during a period of one second, for example. Besides, if the mode of operation is switched from the operation in which only the output from the audio decoder of the audio/video decoder 107 is distributed between the output for viewing and output for recording to the operation in which the audio decoders within the two audio/video decoders 107 and 127 are used, the display being viewed is not interrupted but the flow of signals occurs as follows. The video signal is split from the video decoder of one audio/video decoder 107. The audio signals are decoded by the two audio decoders separately. The software architecture controlling them is complicated.

Another conceivable method of switching the recording decoder from one unit to another at the timing when a received service is started to be recorded. FIG. 4 is a state transition diagram of a digital broadcast receiver illustrating this control method. FIG. 5 is a state transition diagram schematically illustrating the state in which the decoder within the digital broadcast receiver is switched. In FIG. 5, a main signal 141 is a signal that is output for viewing. A subsidiary signal 161 represents a signal output for recording.

In FIG. 4, when the power is turned on (S100), the output from the audio/video decoder 107 in the flow line A is distributed to the output for viewing and output for recording. The audio/video decoder 127 in the flow line B is not used. When the setup at the time when the power is turned on is completed, the receiver goes to the state of "normal viewing" (S101) (see FIG. 5). Under the state of "normal viewing", if the user makes a request for tuning in to a station for viewing, only the audio/video decoder 107 in the flow line A is tuned. Since the output from the audio/video decoder 107 is distributed to the main signal 141 (for viewing) and subsidiary signal 161 (for recording), the same service is received at the output for viewing and at the output for recording. If the user wants to record a service that is delivered to the output for recording, the user sends a request for fixing the output for recording via the user interface of the digital broadcast receiver. In response to this request, the digital broadcast receiver shifts to the state of "start of fixing of output for recording" (S102).

In the digital broadcast receiver, output from the audio/video decoder 107 in the path line A is distributed to the output for viewing and output for recording and so the subsidiary signal 161 for recording is cut off. The audio/video decoders 127 and 107 in the path lines B and A, respectively, are tuned in to the same station. This is assigned as the output for recording to the subsidiary signal 161. After ending this processing, the receiver goes to the state of "fixing of output for recording because of during recording" (S103) (see FIG. 5).

In the state of "fixing of output for recording because of during recording" (S103), if the user makes a request for tuning to a desired station for viewing, only the audio/video decoder 107 in the path line A tunes. Since the audio/video decoder 107 is connected only with the output for viewing, the viewed service can be switched without interrupting the reception at the output for recording. Where the user wants to end the recording of service that is delivered to the output for recording, the user makes a request for canceling the fixing of the output for recording via the user interface of the digital broadcast receiver. In response to this request, the digital broadcast receiver shifts to the state of "end of fixing of output for recording" (S104).

The digital broadcast receiver also disconnects the output for recording from the audio/video decoder 107, distributes the output from the audio/video decoder 107 in the path line A between the main signal 141 (output for viewing) and the subsidiary signal 161 (output for recording), and stops the use of the audio/video decoder 127. After end of the processing described so far, the receiver goes to the state of "normal viewing" (S101). The digital broadcast receiver having the plural decoders makes such transitions of state and performs processing and thus switches to and fro between the state of normal viewing (S101) and the state in which the service delivered for recording is viewed while fixing the service for recording into a recording device (S102-S104).

In the transient state of FIG. 4, the audio/video decoder 107 is started to be switched at the timing when the state shifts to the state of "start of fixing of output for recording" (S102) and so it follows that the audio and video signals on the recording side are interrupted.

As exceptions, in a case where recording is started after an operation for fixing the output for recording is performed on the digital broadcast receiver, and in a case where the digital broadcast receiver senses the state of the recording device connected with the outside and the recording device is equipped with means for achieving the state of "start of fixing of output for recording" (S102) immediately after the recording device starts recording, the aforementioned interruption of audio and sound signals presents no problems.

However, where recording is made by outputting the signal for recording from the digital broadcast receiver to various kinds of recording devices such as general video tape recorder, hard disk video recorder, and video disk recorder, if the recording is made by performing an operation on the recording device, it may be impossible for the digital broadcast receiver to judge that the recording is being done. That is, recording on the side of the recording device may be started while the receiver is in the state of "normal viewing". At this time, the user is recording into the recording device. Therefore, if he wants to fix the recording output from the digital broadcast receiver and performs an operation on the digital broadcast receiver to shift to "start of fixing of output for recording", there is a problem that the audio and video signals on the recording side are interrupted at this timing.

In view of the foregoing, the present invention has been made. It is desirable to provide a digital broadcast receiver which is equipped with plural decoders and which, when recording of a program is initiated or when a service to be viewed subsequently is switched, prevents audio and video signals from being interrupted in spite of switching of the used decoder.

A digital broadcast receiver according to one embodiment of the present invention has a first receiver unit for receiving a certain channel of program from a multichannel digital broadcast under a state of normal viewing, a first decoder for decoding an encoded signal of the digital broadcast received by the first receiver unit and for outputting the decoded signal as a signal for viewing, a second receiver unit for receiving the digital broadcast in the certain channel from the multichannel digital broadcast under the state of normal viewing, and a second decoder for decoding the encoded signal of the digital broadcast received by the second receiver unit and for outputting the decoded signal as a signal for recording.

According to this embodiment of the invention, the two decoders are tuned in to the same program from the state of normal viewing. The two decoders are assigned between the output for viewing and the output for recording. For example, when recording of a program is started or when the program is switched to view a program different from the subsequently recorded program, processing for switching the used decoder from one unit to another at that timing is dispensed with.

According to an embodiment of the present invention, two or plural decoders are tuned in to the same program from the state of normal viewing and assigned to the output for viewing and output for recording, respectively. Therefore, when recording of a program is started or when the program is switched to view a program different from a subsequently recorded program, processing for switching the decoder from one unit to another at that timing is made unnecessary. This can prevent interruption of audio and video signals that would normally be caused by switching the used path line including a decoder.

Furthermore, one of the first and second decoders is used in a given application (i.e., for viewing), while the other is used in another given application (i.e., output for recording). Consequently, the first and second decoders can be made different in design specifications. This is very advantageous for maintenance, quality management, and cost saving.

BRIEF DESCRIPTION OF THE DRAWINGS

FIG. 2 is a state transition diagram illustrating one embodiment of the invention;

FIG. 3 is a block diagram of a related art digital broadcast receiver;

FIG. 4 is a state transition diagram illustrating the related art example; and

FIG. 5 is another state transition diagram illustrating the related art example.

DESCRIPTION OF THE PREFERRED EMBODIMENT

Figure 1:
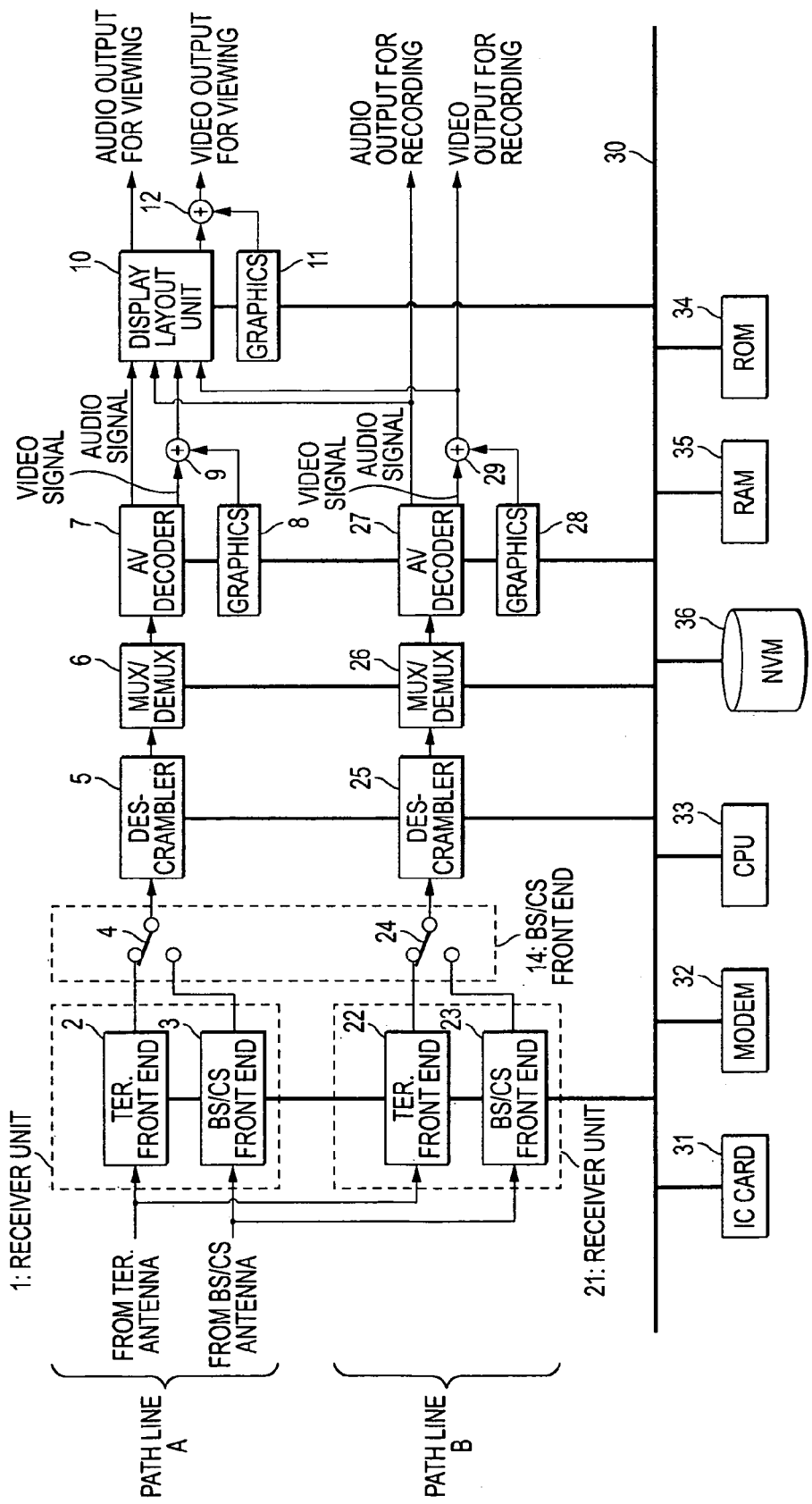
FIG. 1 is a block diagram of a digital broadcast receiver according to one embodiment of the present invention.

One embodiment of the present invention is hereinafter described with reference to FIGS. 1 and 2.

FIG. 1 is a block diagram of a configuration according to one embodiment of the present invention. In FIG. 1, there is shown a digital broadcast receiver having two or plural decoders. The receiver is so designed that it performs an explicit operation including decoding the same service with the decoders if one service is being viewed and assigning the outputs from the decoders to the output for viewing and the output for recording, respectively. The difference between the configuration of the present embodiment shown in FIG. 1 and the related art example of FIG. 3 is that one decoder of FIG. 1 is assigned to viewing purposes while the other decoder is assigned to recording purposes and that the switching unit 115 in the example of the related art has been omitted.

In FIG. 1, a receiver unit 1 has front ends 2 and 3. The front end 2 tunes to one channel out of multichannel terrestrial digital broadcasts (hereinafter referred to as terrestrial TV) received at an antenna for terrestrial digital broadcasts and decodes the service into a signal that can be image-processed. The front end 3 tunes to one channel from multichannel BS/CS digital broadcasts (hereinafter abbreviated BS/CS TV) received at an antenna for BS/CS digital broadcasts and performs similar processing. Another receiver unit 21 is also equipped with front ends 22 and 23 and has functions similar to those of the above-described receiver unit 1. The decoded stream data of the digital broadcast is sent to descramblers 5 and 25 via a selector unit 14.

The selector unit 14 is equipped with switches 4 and 24 and is a device for selecting between terrestrial TV broadcasts and BS/CS broadcasts according to a user's instruction. In this embodiment, the receiver is in the state in which the switch 4 selects the terrestrial TV front end 2 and the switch 24 also selects the terrestrial TV front end 22. The descramblers 5 and 25 are devices acting to descramble the stream data. The descrambled stream data is sent to multiplex/demultiplex units (MUX/DEMUX) 6 and 26, which are devices for extracting audio and video signals, superimposed character information, electronic program guide (EPG) information, control signals, and other information from the descrambled digital broadcast downstream data.

Audio/video decoders 7 and 27 act as decoding devices and decode encoded audio and video signals extracted by the multiplex unit. The audio signal from the audio/video decoder 7 and the video signal are entered into a display layout unit 10 for viewing, the video signal having character information superimposed thereon by an adder 9 (described later). On the other hand, the audio signal from the audio/ video decoder 27 and the video signal on which character information has been superimposed by an adder 29 (described later) are output to a recording device (not shown) for recording or input to the display layout unit 10 for viewing. The adders 9 and 29 superimpose character information output from graphics units 8 and 28 onto the video signal delivered from the audio/video decoders.

When two or plural pictures are displayed on a display unit (not shown) connected with the display layout unit 10 for viewing, a signal for viewing is sent from the audio/video decoder 27 to the display layout unit 10. When one picture is displayed, the signal may be annihilated within the display layout unit 10. Alternatively, a selector unit may be mounted to control the input of signal to the display layout unit 10. The recording signal input to the recording device is recorded as recorded data into a nonvolatile recording device (not shown).

Each of the audio/video decoders 7 and 27 has an audio decoder and a video decoder integral with it. Both decoders may also be separate from each other. The graphics units 8 and 28 are devices for performing processing for superimposing character information sent from a CPU (described later). The graphics units 8 and 28 may be so configured that they directly receive character information to be superimposed from the multiplex/demultiplex units and perform given processing.

The display layout unit 10 delivers the audio signal from the audio/video decoders 7 and 27 and the video signal on which the character information has been superimposed, according to the form of display on the display unit connected for viewing. For example, where the display unit has a multi-image display function and when the display unit is in the single-image mode, the display unit makes such a layout that either one image is displayed. When the display unit is in the dual-image mode, the display unit controls the layout such that both images are displayed on the display screen, thus achieving dual-image display. The graphics unit 11 is a device for controlling the arrangement of superimposed characters when two or multiple images are displayed.

The output destination of the signal for viewing is a device for viewing, such as a CRT (cathode-ray tube) display, plasma display, liquid crystal display, speaker, or headphone. The output destination of the signal for recording is a composite video terminal for recording into an external device, component video terminal, D video terminal, IEEE-1394 terminal, or other output terminal. The output for recording is input into a recording device connected with the output terminal for recording. Data for recording is recorded in a nonvolatile recording device such as a hard disk or DVD (not shown).

Key information for descrambling the limited reception method such as a conditional access (CA) system is recorded in an IC card portion 31. Descramblers 5 and 25 can descramble the digital broadcast programs received using the key information supplied from the IC card portion 31. A modem 32 is a communication device, for example, which when personal information about users and information about fees are sent to a broadcast provider in a pay broadcast service, makes an access to the Internet from the modem 32 via a telephone network and performs bidirectional communication of information. A CPU 33 is a control device for controlling the whole digital broadcast receiver. For example, the CPU provides control to switch the decoders according to a program loaded in a ROM (read-only memory) 34. The CPU selects a desired channel through a receiver unit. The CPU selects a desired broadcast through a selection unit. A RAM 35 is a memory acting as a working area for the CPU 33. A nonvolatile memory 36 is a memory for storing a channel number viewed by the viewer immediately before the power supply was turned off last time, and the like.

These IC card portion 31, modem 32, CPU 33, ROM 34, RAM 35, and nonvolatile memory 36 are connected by a bus (control line) 30 to permit data communications among them. Connected with the bus 30 are the front ends 2, 3, 22, 23 of the receiver units 1, 21, descramblers 5, 25, multiplex/demultiplex units 6, 26, audio/video decoders 7, 27, graphics units 8, 28, display layout unit 10, and graphics unit 11. The CPU 33 is designed to control the various portions via the bus 30.

In the digital broadcast receiver of FIG. 1, the signal path line passing through the receiver unit 1, descrambler 5, multiplex/demultiplex unit 6, and audio/video decoder 7 is hereinafter referred to as the path line A. The signal path line passing through the receiver unit 21, descrambler 25, multiplex/demultiplex unit 26, and audio/video decoder 27 is referred to as the path line B. In FIG. 1, the output from the audio/video decoder 7 in the path line A is assigned, in principle, for viewing purposes and the output from the audio/video decoder 27 in the path line B is assigned for recording purposes. Also, in the state of FIG. 1, the service received through the audio/video decoder 7 in the path line A is output for viewing and the service received through the audio/video decoder 27 in the path line B is output for recording. Under this condition, even in a circumstance where the user does not explicitly want to execute recording of a program, separate signal path lines are previously prepared for viewing and recording, respectively, using the two or plural audio/video decoders.

The operation of the digital broadcast receiver in the present embodiment is next described with reference to FIG. 2.

FIG. 2 is a state transition diagram illustrating the state of "normal viewing" of the digital broadcast receiver and the state of "fixing of output for recording because of during recording". In FIG. 2, in the state of "power turned on" (S0), both path lines A and B receive the same digital broadcast program. The audio/video decoder 7 in the path line A is connected for viewing, while the audio/video decoder 27 in the path line B is connected for recording. When the setup at the time when the power is turned on is completed, the receiver goes to the state of "normal viewing" (S1). Under the state of "normal viewing", if the user performs an operation for tuning to a desired station and thus the service is switched, the audio/video decoder 7 in the path line A in FIG. 2 and the audio/video decoder 27 in the path line B are tuned to the same desired service at the same time.

When the user wants to record the service that is delivered to the output for recording, the user issues an instruction for recording via the user interface of the digital broadcast receiver. At this time, the CPU 33 receives the user's instruction for recording (i.e., instruction for fixing the output for recording) and causes the digital broadcast receiver to shift to the state of "start of fixing of output for recording" (S2). Under this condition, any specific operation is performed neither on the audio/video decoder 7 in the path line A nor on the audio/video decoder 27 in the path line B. The receiver intact goes to the state of "fixing of output for recording because of during recording" (S3).

Under the state of "fixing of output for recording because of during recording" (S3), if there is a request for tuning to a desired station for user's viewing, the CPU 33 receives the user's instruction to switch the program (instruction for selecting a station from the output for viewing) and issues a tuning instruction only to the audio/video decoder 7 in the path line A. At this time, the audio/video decoder 7 is connected only with the output for viewing and so the state of reception at the output for recording is prevented from being interrupted if the service viewed and listened to is switched. Where the user wants to end the recording of the service that is being delivered to the output for recording, the user makes a request for canceling the fixing of the output for recording via the user interface of the digital broadcast receiver. In response to the request, the receiver shifts to the state of "end of fixing of output for recording" (S4).

Where the station to which the audio/video decoder 27 in the path line B is tuned is different from the station to which the audio/video decoder 7 in the path line A is tuned, the digital broadcast receiver adjusts the station to which the line B is tuned to the station to which the line A is tuned. After completing the processing described so far, the receiver goes to the state of "normal viewing" (S1).

In the present embodiment, when recording of a service is started or when the service is subsequently switched, processing for switching the used decoder from one to another at that timing is dispensed with, unlike in the related art method of control (see FIGS. 3-5). Therefore, the digital broadcast receiver makes recording of the output for recording in response to an operation on the recording device while the receiver is kept in the state of "normal viewing". If a request for "start of fixing of output for recording" is subsequently made for the digital broadcast receiver, the receiver can shift to the state of "fixing of output for recording because of during recording" without interrupting the output for recording.

According to the embodiment described so far, the two or plural decoders are tuned to the same program from the state of normal viewing and assigned to the output for viewing and output for recording, respectively. Therefore, when recording of the program is started or when the service is switched to subsequently view a program different from the recorded program, processing for switching the used decoder from one to the other at that timing is made unnecessary. This can prevent interruption of the audio and video signals that would otherwise be caused by switching of the line including a decoder.

In the case of the present embodiment, one of the two audio/video decoders in the path lines A and B is used only for viewing, while the other is used only for output for recording. In this way, the applications are fixed. Therefore, where the audio/video decoder in the path line A and the audio/video decoder in the path line B are not equivalent in specifications or performance, the purpose can also be achieved with a system having plural asymmetrically configured decoders (e.g., the output of the audio/video decoder for viewing has been optimized for display on the viewing screen but the audio/video decoder in the path line B is not).

For example, with respect to a dual decoded digital broadcast receiver, the video decoder for outputting a signal for viewing generally corresponds to high definition TV broadcasts (HDTV broadcasts). On the other hand, the video decoder for outputting a signal for recording corresponds to TV broadcasts such as NTSC broadcasts (SD image broadcasts).

Generally, a video decoder has a buffer portion for temporarily storing an input bit stream of video data, a calling portion for calling the video data from the buffer portion, and a memory portion for storing the called video data. The video decoder is so designed that video data stored in the memory portion are combined into a block at a given timing and sent out. In the case of a digital broadcast program, a video signal entered into a video decoder is a HD image of 1090×1080 pixels. Where the signal is output for viewing, the video decoder sends out the image without varying the amount of information, i.e., HD. Meanwhile, where the signal is output for recording, the image is downconverted into an SD image of 720×480 pixels and sent out.

Where the applications of the audio/video decoders in the path lines A and B are not restricted as in the related art example, each decoder can be used for both viewing and recording purposes. In this case, it is recommended that the audio/video decoders in both path lines A and B be matched in specifications. If the descramblers, multiplex/demultiplex units, and audio/video decoders of the digital broadcast receiver are made up of one chip, it would be difficult to exchange only the audio/video decoders later. It becomes more important to match the path lines A and B in terms of specifications.

Where one of the decoders in the path lines A and B is assigned for viewing and the other is for recording as in the embodiment of the invention described above, a dual coded digital broadcast receiver can be accomplished with non-equivalent, asymmetrical decoders having their respective specialized features. Since the two decoders can be made asymmetrical in terms of specifications, this receiver is very advantageous for maintenance, quality control, and cost saving.

Where one decoder is made compliant with SD images, the amount of information can be suppressed compared with HD images. Therefore, the capacity of the memory portion can be made smaller. The physical size of the memory portion can be reduced. In addition, the bandwidth can be narrowed because the amount of information of the video signal decreases. Signal lines located downstream of the memory portion within the decoder can be made thinner.

Generally, a two-picture display unit is laid out such that the left side of the display screen is used for viewing, while the right side of the display screen is used for displaying the content of a program to be recorded. In many product specifications, the left side of the display screen displays a HD image, while the right side displays an SD image. Accordingly, if an SD image is sent to the display layout unit 10 from the audio/video decoder 27 as shown in FIG. 1, no practical problems occur.

In the above-described embodiment, it is not necessary to dynamically switch the output from the audio/video decoder 107 and the output from the audio/video decoder 127 between the output for viewing and the output for recording using the switching unit 115, unlike in the example of the related art of FIG. 3. Hence, the switching unit 115 can be omitted. Consequently, the configuration of the digital broadcast receiver can be simplified. Also, the cost can be reduced.

It is considered that even if plural video decoders and plural audio decoders are present in a single digital broadcast receiver, only one CA system is present for the same kind of broadcast. It is considered that a different CA system is installed in each receiver. However, a commercial product which is aimed at the general user and has two systems of the same construction (i.e., two IC cards of the same kind are inserted into the digital broadcast receiver, and the receiver urges the user to perform different procedures for unsubscribing from the IC cards) is not conceivable.

Therefore, where the service to be viewed is scrambled, a key for descrambling the service is preferably gained from the CA system. If the user accesses the CA system (IC card) twice for the same service, the operation is equivalent to gaining the same key twice. In consequence, there is a possibility that a problem occurs with the CA system. Therefore, if the keys to be gained are the same, the CA system gains the key only once and distributes it to two descramblers. This operation is performed in software.

It is to be understood that the present invention is not limited to the embodiment described above. Of course, it can adopt various other forms without departing from the gist of the present invention.

What is claimed is:

1. A digital broadcast receiver comprising:
   first reception means for receiving a certain channel of program from a multichannel digital broadcast under a state of normal viewing;
   first decoding means for decoding an encoded signal of the digital broadcast received by said first reception means and for outputting the decoded signal as a signal for viewing;
   second reception means for receiving the digital broadcast in said certain channel from said multichannel digital broadcast under said state of normal viewing; and
   second decoding means for decoding the encoded signal of the digital broadcast received by said second reception means and for outputting the decoded signal as a signal for recording,
   wherein the first and second decoding means are tuned to the same program from the state of normal viewing, and, upon receiving a request, the first decoding means is assigned to the output for viewing, and the second decoding means is assigned to the output for recording.

2. The digital broadcast receiver as set forth in claim 1, further comprising:
   control means for fixing the output of said signal for recording when a recording instruction for recording said signal for recording outputted from said second decoding means is received in said state of normal viewing, and
   wherein said control means instructs said first reception means to switch the received program based on an instruction to switch the signal for viewing outputted from said first decoding means when the output of said signal for recording is fixed and said instruction is received.

3. The digital broadcast receiver as set forth in claim 2, wherein, when a switching instruction for switching said signal for viewing outputted from said first decoding means is received under said state of normal viewing, said control means instructs said first and second reception means to switch the received program based on said switching instruction.

4. The digital broadcast receiver as set forth in claim 1, wherein the display unit to which said signal for viewing is supplied has a function of displaying plural pictures on a single viewing screen, said second decoding means outputs the signal for viewing in addition to said signal for recording.

5. The digital broadcast receiver as set forth in claim 1, wherein said first and second decoding means have different design specifications.

6. A digital broadcast receiver comprising:
   a first receiver unit receiving a certain channel of program from a multichannel digital broadcast under a state of normal viewing;
   a first decoder decoding an encoded signal of the digital broadcast received by said first receiver unit and outputting the decoded signal as a signal for viewing;
   a second receiver unit receiving the digital broadcast in said certain channel from said multichannel digital broadcast under said state of normal viewing; and
   a second decoder decoding the encoded signal of the digital broadcast received by said second receiver unit and outputting the decoded signal as a signal for recording,
   wherein the first and second decoders are tuned to the same program from the state of normal viewing, and, upon receiving a request, the first decoder is assigned to the output for viewing, and the second decoder is assigned to the output for recording.

7. A method of controlling reception of a digital broadcast by a digital broadcast receiver having first reception means for receiving a certain channel of program from a multichannel digital broadcast under a state of normal viewing, first decoding means for decoding an encoded signal of the digital broadcast received by said first reception means and for outputting the decoded signal as a signal for viewing, second reception means for receiving the digital broadcast in said certain channel from said multichannel digital broadcast under said state of normal viewing, and second decoding means for decoding the encoded signal of the digital broadcast received by said second reception means and for outputting the decoded signal as a signal for recording, said method comprising the steps of:
   fixing output of said signal for recording in a case where a recording instruction for recording said signal for recording outputted from said second decoding means is issued under said state of normal viewing; and
   switching the program received by said first receiver unit based on a switching instruction in a case where the output of said signal for recording is fixed and said switching instruction for switching said signal for viewing outputted from said first decoding means is issued,
   wherein the first and second decoding means are tuned to the same program from the state of normal viewing, and, upon receiving a request, the first decoding means is assigned to the output for viewing, and the second decoding means is assigned to the output for recording.

8. The method of controlling reception of a digital broadcast as set forth in claim 7,
   wherein, when a switching instruction for switching said signal for viewing outputted from said first decoding means is issued under said state of normal viewing, the program received by said first and second reception means is switched based on said switching instruction.

* * * * *

UNITED STATES PATENT AND TRADEMARK OFFICE
CERTIFICATE OF CORRECTION

PATENT NO.      : 7,626,640 B2
APPLICATION NO. : 11/294033
DATED           : December 1, 2009
INVENTOR(S)     : Takashi Toida It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1030 days.

Signed and Sealed this

Second Day of November, 2010

David J. Kappos
*Director of the United States Patent and Trademark Office*